(12) United States Patent
Yang et al.

(10) Patent No.: US 7,304,564 B2
(45) Date of Patent: Dec. 4, 2007

(54) AUTOMOTIVE DETECTING SYSTEM AND A METHOD THEREOF

(76) Inventors: Ching-Lun Yang, 3F, No. 2-1, Alley 1, Lane 25, Hsing Shan Rd., Nei Hu Dist., Taipei City (TW); Shang-Ming Chi, 1F, No. 15, Lane 494, Wu Hsing St., Taipei City (TW)

( * ) Notice: Subject to any disclaimer, the term of this patent is extended or adjusted under 35 U.S.C. 154(b) by 236 days.

(21) Appl. No.: 11/113,141

(22) Filed: Apr. 25, 2005

(65) Prior Publication Data

US 2006/0238315 A1    Oct. 26, 2006

(51) Int. Cl.
*B60R 25/10*    (2006.01)
(52) U.S. Cl. ............... 340/426.13; 307/10.5; 340/5.61; 340/5.72; 340/426.16
(58) Field of Classification Search ........... 340/426.13, 340/426.15, 426.16, 5.6, 5.61, 5.72; 307/10.2, 307/10.3, 10.5
See application file for complete search history.

(56) References Cited

U.S. PATENT DOCUMENTS

| | | | | |
|---|---|---|---|---|
| 5,515,036 A * | 5/1996 | Waraksa et al. | ....... | 340/825.72 |
| 5,659,291 A * | 8/1997 | Kennedy et al. | ............ | 307/10.2 |
| 5,751,073 A * | 5/1998 | Ross | .......................... | 307/10.5 |
| 6,236,333 B1 * | 5/2001 | King | .......................... | 340/5.61 |
| 6,297,731 B1 * | 10/2001 | Flick | ....................... | 340/426.16 |
| 6,922,147 B1 * | 7/2005 | Viksnins et al. | ......... | 340/573.1 |
| 2002/0149469 A1 * | 10/2002 | Thompson, Jr. | ........... | 340/5.61 |

* cited by examiner

*Primary Examiner*—Thomas Mullen
(74) *Attorney, Agent, or Firm*—Rosenberg, Klein & Lee

(57) ABSTRACT

An automotive detecting system includes an automotive detecting host to detect when a car owner is near their car using a wireless technology. The automotive detecting host automatically controls a door locking mechanism, an alarm, and/or the car's ignition. The automotive detecting host includes an identity identification unit, a CODEC control unit, and a micro-control unit, and automatically controls the door locking mechanism, the alarm and/or the ignition as a user or a car owner approaches their car.

30 Claims, 4 Drawing Sheets

AUTOMOTIVE DETECTING SYSTEM AND A METHOD THEREOF

BACKGROUND OF THE INVENTION

1. Field of the Invention

The present invention relates to an automotive detecting system and a method thereof, and more particularly to an automotive detecting host for a car that automatically controls the car's door locks, alarm, and/or ignition when the automotive detecting system detects, through wireless technology, that the car's owner is approaching or departing an area nearby their car.

2. Description of Related Art

As the automobile has evolved it has become commonplace for remote control burglar alarm systems to be installed in them. The conventional remote control burglar alarm system comprises a burglar alarm host in a car and a remote controller. The burglar alarm host not only serves as a deterrent to would be car thieves, but also controls the locking and unlocking of the car's doors. The burglar alarm host is controlled wirelessly by a remote controller of which a number of function keys control the car doors and the burglar alarm. As mentioned above, car owners need to carry the remote controller about with them. If the car owner loses the remote controller, the car owner needs to use a key to open and start the car's ignition. Moreover, the car owner needs to choose and press the function keys of the remote controller while controlling the burglar alarm system.

Prior art designs have the problem that because the remote controller controls the door locking mechanism if the car's owner leave their children or pets in the car they can be stuck in the car, unable to get out, sometimes resulting in disastrous consequences.

In view of the aforementioned drawbacks, the inventor of the present invention, based on years of experience in the related field, and having conducted extensive research into both the theoretical and practical problems of the related field, has finally invented a feasible design to effectively overcome the aforementioned drawbacks.

SUMMARY OF THE INVENTION

The main objective of the present invention is to overcome the problem of the inconveniences of the prior automotive burglar alarm system. To solve the above objective, the present invention provides an automotive detecting system and a method thereof, which comprises of an automotive detecting host that detects when the car's owner is approaching or departing an area near their car by wireless technology to automatically control the car's door locking mechanism, alarm, and/or ignition. Accordingly, the present invention improves upon the drawbacks of the prior art.

The automotive detecting system comprises an identity device and an automotive detecting host. The identity device is carried by a user or a car owner for receiving a detecting signal or transmitting an identity signal near the identity device over a predetermined distance. The automotive detecting host wirelessly connects to the identity device, for detecting the identity device and controlling at least one alarm or at least one door locking mechanism of the car.

The automotive detecting system can further comprise of an in-car sensing device and a key-detecting device, for detecting when people or the car's key are in the car. It also has an updating function; the automotive detecting system can further comprise a download board electrically connected to the automotive detecting host, for downloading additional functions. Moreover, the automotive detecting system can further comprise a connector device, for outputting a control signal to the alarm or the door locking mechanism.

The automotive detecting host comprises an identity identification unit, a CODEC control unit, and a micro-control unit. The identity identification unit transmits a detecting signal to detect the identity device and receives an identity signal transmitted from the identity device with a predetermined distance. The CODEC control unit electrically connects to the identity identification unit, for performing signal protection, signal code/decode or signal control, and at last outputs a control signal to decide control the status of the alarm or the door locking mechanism. The micro-control unit electrically connects to the CODEC control unit, for executing logic control of signal and instruction sets. Therefore, the automotive detecting host detects the location of the identity device to control status of the alarm or the door locking mechanism of the car.

For added convenience, the automotive detecting host can further comprise an input/output interface unit to communicate with some peripheral electronic devices. Finally, the automotive detecting host can further comprise at least one light emitter displayer, for displaying the status of the automotive detecting host to the car's owner.

A detecting method for the automotive detecting system of the present invention comprises the steps of: the automotive detecting host is in standby mode; the automotive detecting host detects the identity device within a predetermined distance; when the identity device nears the automotive detecting host, the car's doors are unlocked, otherwise the automotive detecting host reverts back to the initial step of being in standby mode; the automotive detecting host needs to judge if anyone has opened the car door within a certain period of time; if the car door is opened then the ignition is activated so that the car may be driven, otherwise it is determined if the identity device is within a predetermined distance of the automotive detecting host. Furthermore, the step of unlocking the car doors further comprises of a step of disarming an external burglar alarm, and the step of judging if anyone has opened the car door within a certain period of time further comprises of the step of rearming an external burglar alarm.

Additionally, a detecting method for the automotive detecting system of the present invention that, as a car owner exits their car, comprises of the steps of: after the car is turned off, the automotive detecting host goes into standby mode; the in-car sensing device detects if anyone has remained in the car; if someone has remained in the car then no action is taken; alternatively, if it is determined that the car's key is in the ignition switch, an alarm is sounded and the door locking mechanism is not locked, otherwise it is determined if the identity device is within a predetermined distance of the automotive detecting host; if the automotive detecting system cannot locate the identity device within the predetermined distance then all the car's doors are locked, otherwise the alarm is sounded and the door locking mechanism is not locked.

Therefore, the present is not only controls the automotive detecting host through wireless-technology, but it also automatically operates the door locking mechanism of the car, the alarm system and/or the ignition of the car as the owner approaches or leaves the predetermined distance around their car.

BRIEF DESCRIPTION OF THE DRAWINGS

The various objectives and advantages of the present invention will be more readily understood from the following detailed description when read in conjunction with the appended drawing, in which.

DETAILED DESCRIPTION OF THE PREFERRED EMBODIMENTS

Figure 1:
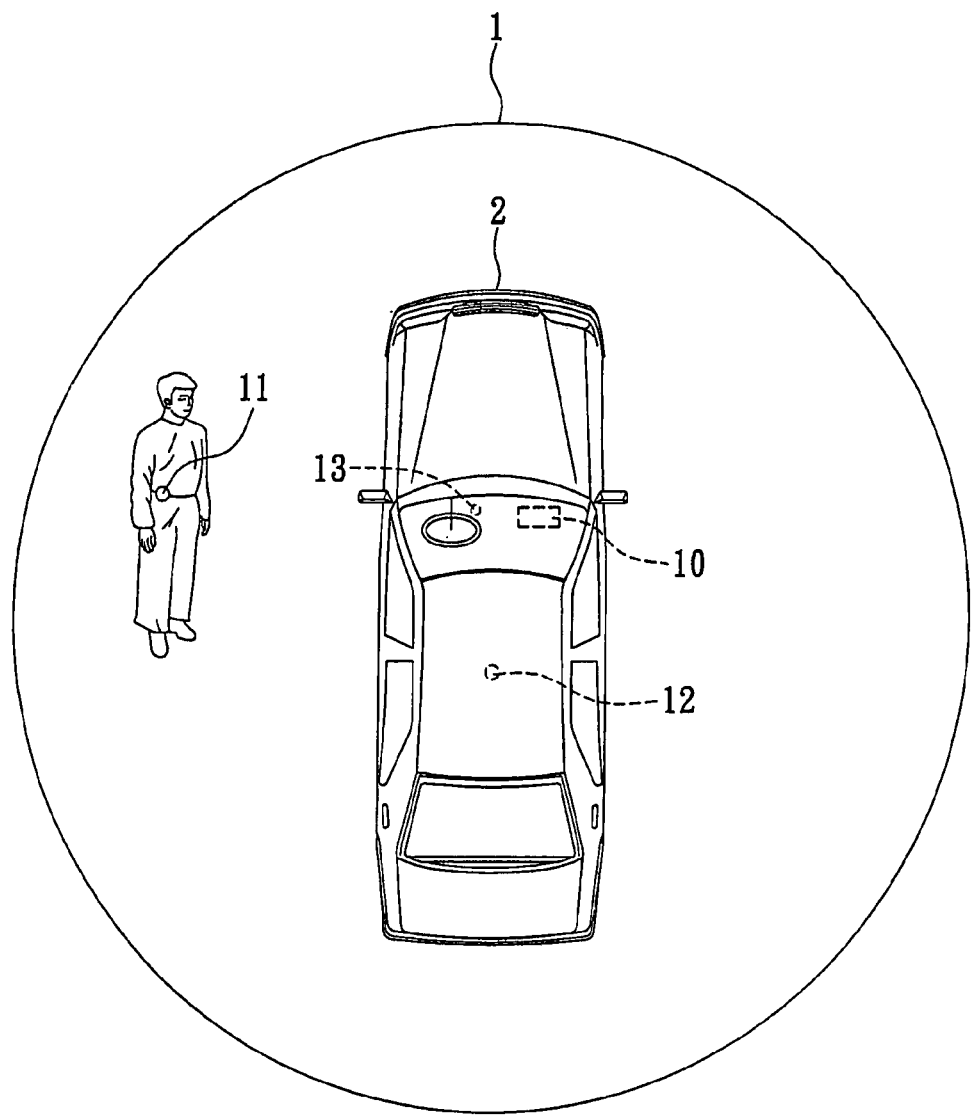
FIG. 1 is an architecture diagram of an automotive detecting system of the present invention.

Reference is made to FIG. 1. The automotive detecting system 1 comprises an identity device 11 and an automotive detecting host 10. The identity device 11 can be a radio frequency identity (RF ID) type device, a Blue-tooth identity type device or an infrared ray identity (IR ID) type device. The identity device 11 is carried with a user or a car owner for receiving a detection signal transmitted from the automotive detecting host 10 and/or for transmitting an identity signal to the automotive detecting host 10 when the identity device 11 is within a predetermined distance. The automotive detecting host 10 electrically connects wirelessly to the identity device 11, for detecting the identity device 11 and controlling at least one alarm or at least one door locking mechanism of the car 2. The automotive detecting system 1 can further comprise an in-car sensing device 12 and a key-detecting device 13. The in-car sensing device 12 can be a light sensor; it electrically connects to the automotive detecting host 10, for detecting movement of any people inside the car then transmitting a signal to the automotive detecting host 10. The key-detecting device 13 electrically connects to the automotive detecting host 10, for detecting the location of the car's key.

Figure 2:
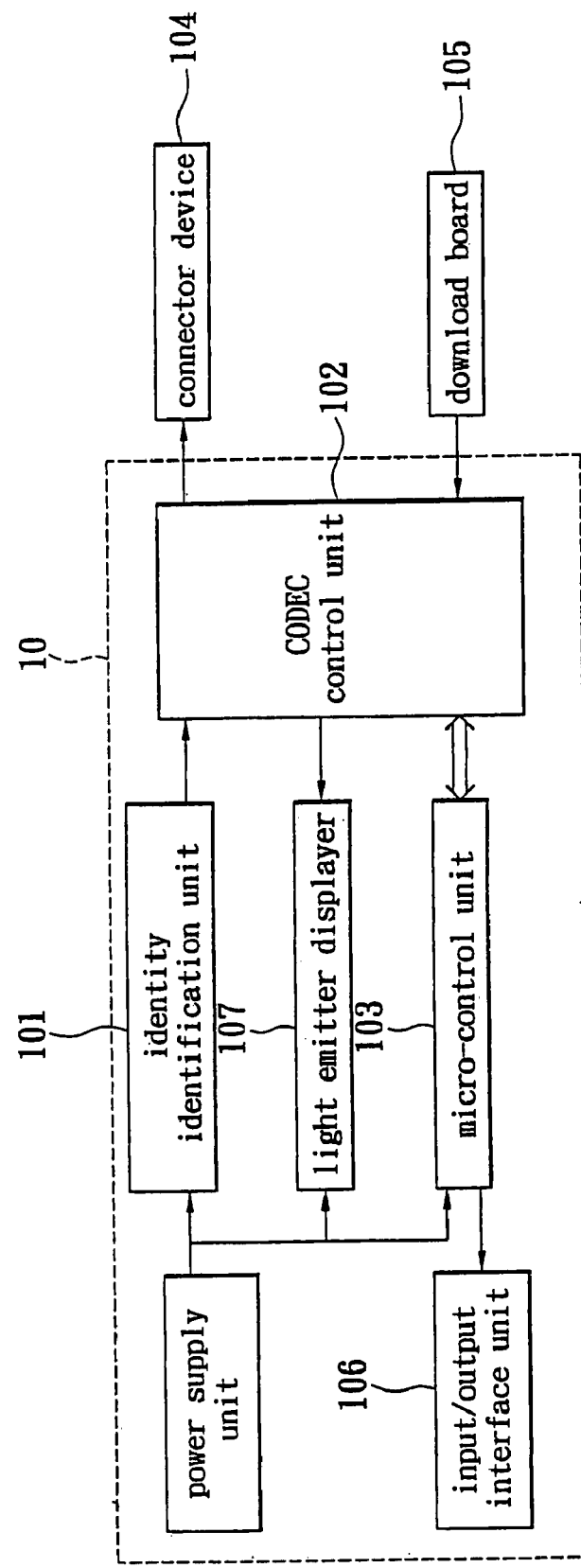
FIG. 2 is a function block diagram of an automotive detecting host of the present invention.

Reference is made to FIG. 2 and FIG. 1. For updating the functions, the automotive detecting system 1 can further comprise a download board 105 electrically connected to the automotive detecting host 10, for downloading additional functions. Moreover, the automotive detecting system 1 can further comprise a connector device 104, for outputting a control signal to at least one alarm or at least one door locking mechanism. The automotive detecting host 10 can comprise an identity identification unit 101, a CODEC control unit 102, and a micro-control unit 103. The identity identification unit 101 can be a RF module, a Blue-tooth module or an IR receiver/transmitter module; it transmits a detecting signal to detect the identity device 11 and receives an identity signal transmitted from the identity device 11 over a predetermined distance. The CODEC control unit 102 electrically connects to the identity identification unit 101, for performing signal protection, signal coding/decoding or signal control for the signals output from the identity device 11, and outputs a control signal to control the at least one alarm or at least one door locking mechanism. The micro-control unit 103 electrically connects to the CODEC control unit 102, for executing the control and instruction sets of the automotive detecting host depending on the control signal output from the CODEC control unit 102. Therefore, the automotive detecting host 10 detects the location of the identity device 11 and controls the at least one alarm or at least one door locking mechanism of the car 2.

For greater convenience the automotive detecting host 10 can further comprise an input/output interface unit 106 to connect with peripheral electronic devices. The automotive detecting host 10 can further comprise at least one light emitter displayer 107, for displaying the status of the automotive detecting host 10 to the car owner. Similarly, the automotive detecting system 1 can further comprise a download board 105 electrically connected to the automotive detecting host 10, for downloading additional functions, and can further comprise a connector device 104, for outputting a control signal to at least one alarm or at least one door locking mechanism.

Figure 3:
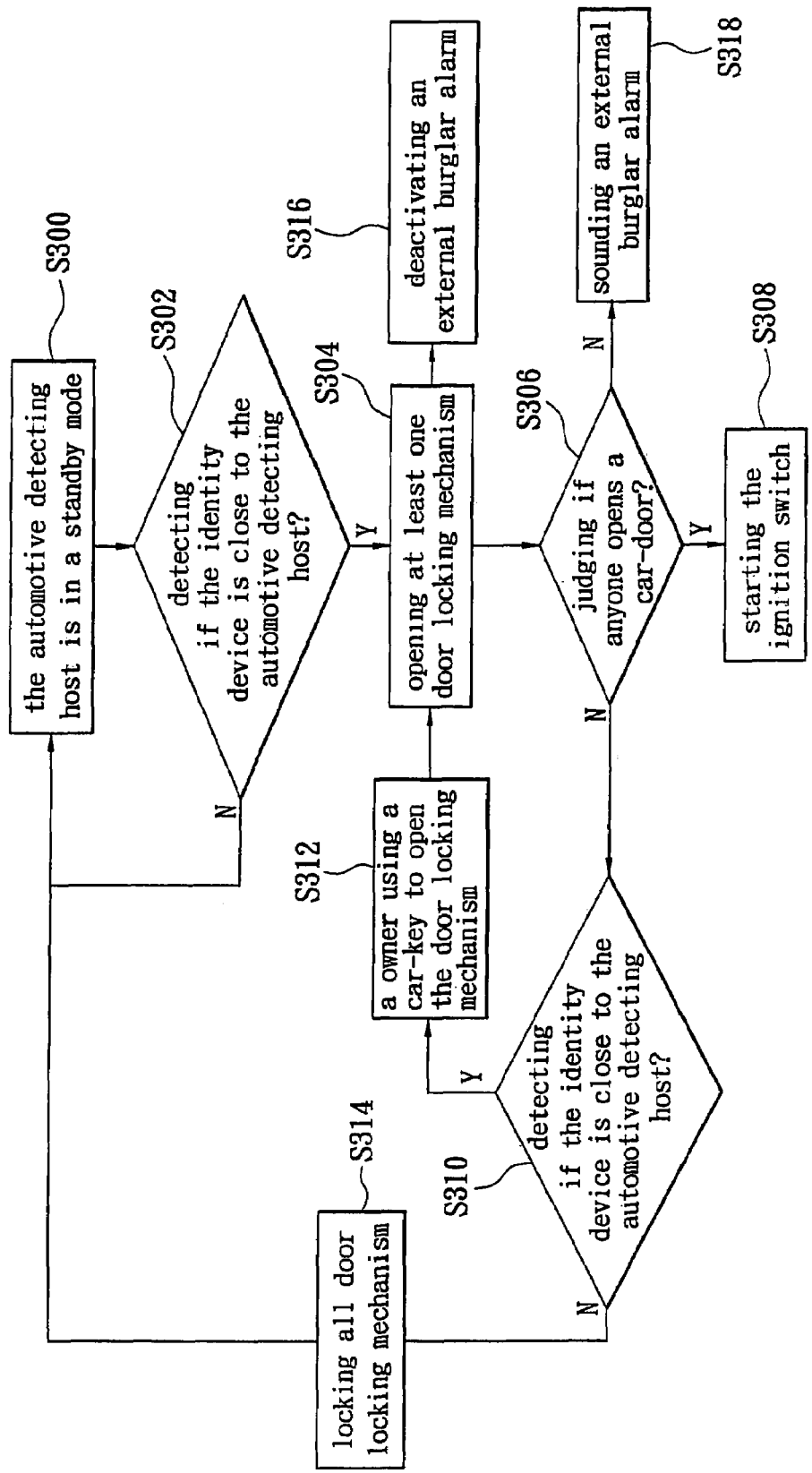
FIG. 3 is a flow chart of the automotive detecting system of the present invention as a car owner approaches their car.

Reference is made to FIG. 3 and FIG. 1. A detecting method for the automotive detecting system 1 of the present invention as a car owner approaches their car, as shown in FIG. 3, comprises of the steps of: the automotive detecting host 10 is in standby mode (step 300); the automotive detecting host 10 detects the identity device 11 within a predetermined distance of the automotive detecting host 10 (step 302); if the identity device 10 nears the automotive detecting host 11 then the at least one door locking mechanism is unlocked (step 304), otherwise the system reverts back to step 300; the automotive detecting host 10 judges if anyone has opened the car-door within a certain period of time (step 306); if anyone has opened the car-door then the ignition switch is started and the car 2 may be driven(step 308), otherwise determining if the identity device 11 is within a predetermined distance of the automotive detecting host 10 (step 310); if the identity device 11 is within a predetermined distance of the automotive detecting host 10 then the door locking mechanism is locked and the car owner needs to use an original car key to open the door locking mechanism (step 312) and then reverting back to step 304; otherwise locking the door locking mechanism (step 314). Whereupon, following step 304 an external burglar alarm is deactivated (step 316), and if a car door is not opened in the step 306 then an external burglar alarm is sounded (step 318).

Figure 4:
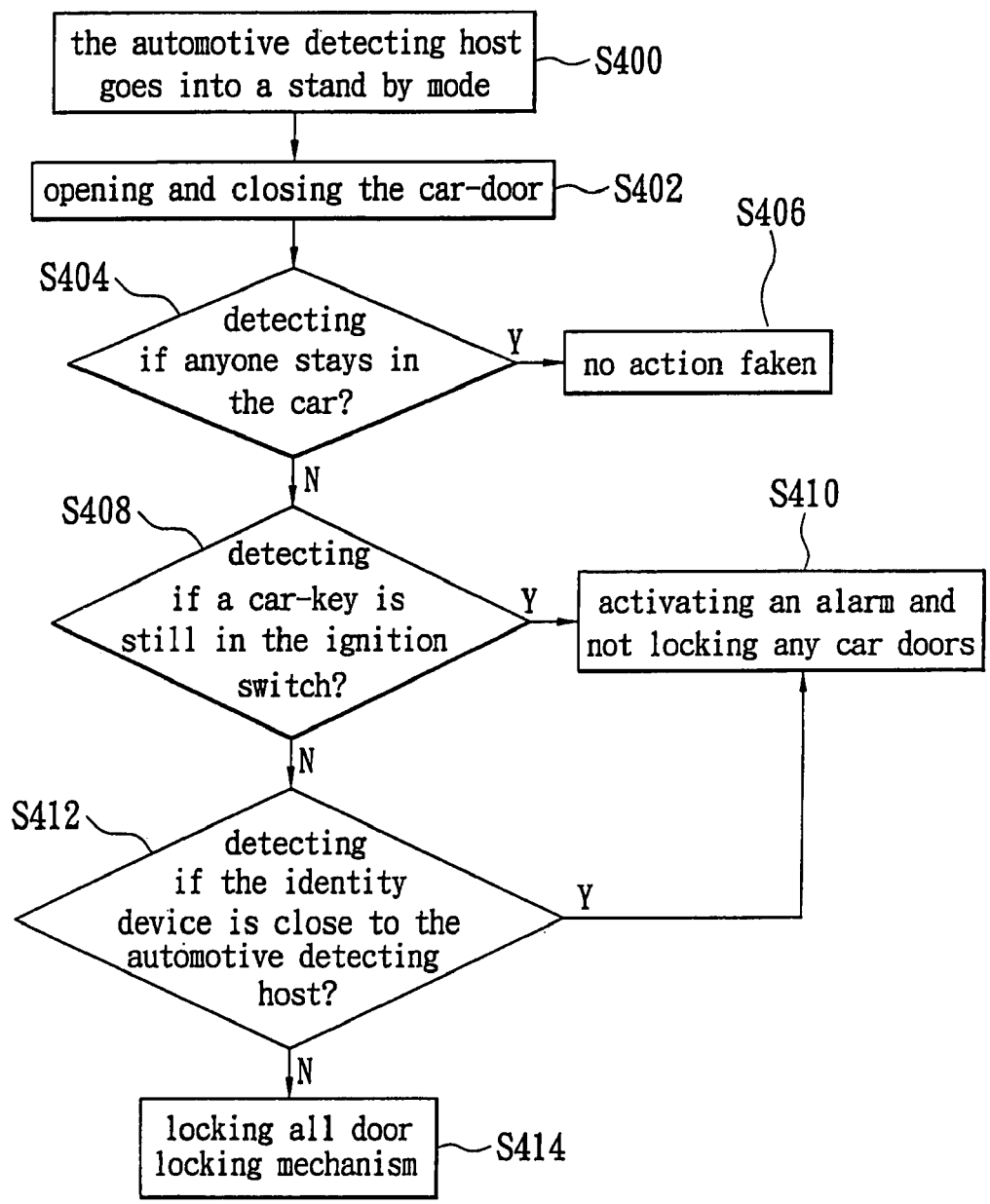
FIG. 4 is a flow chart of the automotive detecting system of the present invention as a car owner moves away from their car.

Reference is made to FIG. 4 and FIG. 1. A detecting method for the automotive detecting system 1 of the present invention when a car owner exits their car, which comprises the steps of: after the car 2 is turned off, the automotive detecting host 10 goes into standby mode (step 400); the car doors are opened and closed as people exit the car (step 402); the in-car sensing device 12 determines if anyone has stayed in the car 2 (step 404); if anyone has stayed in the car then no action is taken (step 406), otherwise the key-sensing device 13 determines if the car's key is still in the ignition switch (step 408); wherein, if the car's key is in the ignition switch an alarm is sounded and the door locking mechanism is not locked (step 410), otherwise detecting if the identity device 11 is within a predetermined distance of the automotive detecting host 10 (step 412); thereupon, if the identity device 11 is within the predetermined distance then executing the step 410, otherwise locking the door locking mechanism (step 414).

The present invention provides an automotive detecting system and a method thereof, which comprises of an automotive detecting host that is able to detect when a car owner is near their car through wireless technology and automatically controls the door locking mechanism, the alarm and/or the ignition for the car. Moreover, the present invention can detect if the car's key has been left in the ignition switch or if anybody has stayed in the car thus avoiding placing children still in the car when their parents are not in danger.

Furthermore, the functions and the programs in the present invention can also be updated, and for this purpose can electrically connect to other electronic devices.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An automotive detecting system, comprising an identity device and an automotive detecting host;
    said automotive detecting host communicating wirelessly with said identity device for detecting said identity device and controlling at least one alarm or at least one door locking mechanism of a car; and
    said identity device carried by a user or a car owner for receiving a detecting signal from said automotive detecting host or transmitting an identity signal within a predetermined distance between said automotive detecting host and said identity device;
    wherein said automotive detecting host comprises:
        an identity identification unit transmitting said detecting signal to detect said identity device and receiving said identity signal transmitted from said identity device within said predetermined distance;
        a CODEC control unit electrically connected to said identity identification unit for performing signal protection, signal coding/decoding, or signal control for signals output from said identity device, and at least outputting a control signal to control said at least one alarm or said at least one door locking mechanism; and
        a micro-control unit electrically connected to said CODEC control unit for performing control and executing instruction sets for said automotive detecting host responsive to said control signal output from said CODEC control unit;
        whereby said automotive detecting host detects proximity of said identity device to control said alarm or said door locking mechanism of said car.

2. The automotive detecting system as claimed in claim 1, wherein said identity device is a radio frequency identification (RF ID) type.

3. The automotive detecting system as claimed in claim 1, wherein said identity device is a Blue-tooth identification type.

4. The automotive detecting system as claimed in claim 1, wherein said identity device is an infrared ray identification (IR ID) type.

5. The automotive detecting system as claimed in claim 1, further comprising an in-car sensing device electrically connected to said automotive detecting host for detecting if any people are inside the car.

6. The automotive detecting system as claimed in claim 5, wherein said in-car sensing device is an optical sensor.

7. The automotive detecting system as claimed in claim 1, further comprising a key-detecting device electrically connected to said automotive detecting host for detecting the location of a car key.

8. The automotive detecting system as claimed in claim 1, wherein said identity identification unit is a radio frequency module.

9. The automotive detecting system as claimed in claim 1, wherein said identity identification unit is a Blue-tooth module.

10. The automotive detecting system as claimed in claim 1, wherein said identity identification unit is an infrared ray module.

11. The automotive detecting system as claimed in claim 1, further comprising a connector device electrically connected to said automotive detecting host for outputting said control signal to said alarm or said door locking mechanism.

12. The automotive detecting system as claimed in claim 1, further comprising a download board electrically connected to said automotive detecting host for updating programs of said automotive detecting host or downloading additional programs to said automotive detecting host.

13. The automotive detecting system as claimed in claim 1, wherein said automotive detecting host further comprises at least one input/output interface unit.

14. The automotive detecting system as claimed in claim 1, wherein said automotive detecting host further comprises at least one light emitter displayer.

15. An automotive detecting host, comprising:
    an identity identification unit, transmitting a detecting signal to detect an identity device and receiving an identity signal transmitted from said identity device within a predetermined distance between said automotive detecting host and said identity device;
    a CODEC control unit, electrically connected to said identity identification unit, for performing signal protection, signal coding/decoding, or signal control for signals output from said identity device, and at least outputting a control signal to control at least one alarm or at least one door locking mechanism; and
    a micro-control unit, electrically connected to said CODEC control unit, for performing control and executing instruction sets for said automotive detecting host responsive to said control signal output from said CODEC control unit;
    whereby, said automotive detecting host detects proximity of said identity device and controls said alarm or said door locking mechanism of a car.

16. The automotive detecting host as claimed in claim 15, wherein said identity identification unit is a radio frequency module.

17. The automotive detecting host as claimed in claim 15, wherein said identity identification unit is a Blue-tooth module.

18. The automotive detecting host as claimed in claim 15, wherein said identity identification unit is an infrared ray module.

19. The automotive detecting host as claimed in claim 15, further comprising a connector device electrically connected to said CODEC control unit for outputting said control signal to said alarm or said door locking mechanism.

20. The automotive detecting host as claimed in claim 15, further comprising a download board electrically connected to said CODEC control unit for updating programs of said automotive detecting host or downloading additional programs to said automotive detecting host.

21. The automotive detecting host as claimed in claim 15, further comprising at least one input/output interface unit.

22. The automotive detecting host as claimed in claim 15, further comprising at least one light emitter displayer.

23. A detecting method for an automotive detecting system for a car having an identity device carried by a user and an automotive detecting host, said detecting method comprising the steps of:

(a) placing said automotive detecting host in a standby mode;
(b) said automotive detecting host detecting if said identity device is within a predetermined distance of said automotive detecting host subsequent to step (a);
(c) said automotive detecting host opening at least one door locking mechanism responsive to said identity device being detected as being within said predetermined distance;
(d) said automotive detecting host judging whether a car door has been opened subsequent to said opening at least one door locking mechanism; and
(e) said automotive detecting host starting the ignition responsive to judging that the user opened a car door.

24. The detecting method of the automotive detecting system as claimed in claim 23, wherein in the step of detecting if said identity device is within a predetermined distance of said automotive detecting host, if the outcome is "no" then said automotive detecting host goes into said standby mode.

25. The detecting method for the automotive detecting system as claimed in claim 23, wherein the step of opening at least one door locking mechanism includes the step of deactivating an external burglar alarm.

26. The detecting method for the automotive detecting system as claimed in claim 23, wherein in the step of said automotive detecting host judging whether a car door has been opened if the outcome is "no", the automotive detecting system detects if said identity device is within said predetermined distance of said automotive detecting host.

27. The detecting method for the automotive detecting system as claimed in claim 23, wherein if said car door is not opened after the step of opening at least one door locking mechanism then a further step of sounding an external burglar alarm is performed.

28. A method for detecting exit of a user from a car in an automotive detecting system having an identity device carried by a user, an in-car sensing device, an automotive detecting host and a key-detecting device, said method comprising the steps of:
(a) placing said automotive detecting host in a standby mode;
(b) detecting if anyone has stayed in the car subsequent to step (a);
(c) detecting if a car key is in the ignition switch if no one is detected as staying in the car in step (b);
(d) detecting if said identity device is within a predetermined distance of said automotive detecting host if no car key is detected in step (c); and
(e) locking a door locking mechanism when said identity device is not detected in step (d).

29. The method as claimed in claim 28, wherein in the step of detecting if a car key is in the ignition switch, if the outcome is "yes" sounding an alarm and not locking the door locking mechanism.

30. The method as claimed in claim 28, wherein in the step of detecting if said identity device is within a predetermined distance of said automotive detecting host, if the outcome is "yes" sounding an alarm and not locking the door locking mechanism.

* * * * *